United States Patent Office 3,725,109
Patented Apr. 3, 1973

3,725,109
METHOD OF PREPARING SULFONATED STYRENE POLYMER PHOTOGRAPHIC FILMS
Gerald L. Schulz, Midland, and Robert J. Caiola, Saginaw, Mich., assignors to The Dow Chemical Company, Midland, Mich.
No Drawing. Continuation of abandoned application Ser. No. 839,069, July 3, 1969. This application Oct. 21, 1971, Ser. No. 191,350
Int. Cl. G03c 1/78
U.S. Cl. 117—47 A        6 Claims

ABSTRACT OF THE DISCLOSURE

Photographic films are made from styrene polymers as the film base without the necessity of using subbing coats between the film base and the photosensitive layer by sulfonating the styrene polymer film base so that it contains a high concentration of sulfonic acid groups. Good adhesion between the layer and the base is obtained.

This is a continuation of application Ser. No. 839,069, filed July 3, 1969, now abandoned.

BACKGROUND OF INVENTION

This invention relates to styrene polymer photographic films and a method of making them.

It is known from Canadian Patent 674,921 that photographic films can be prepared from a polystyrene film base if an acrylic copolymer anchoring layer and a gelatin subbing layer are added to the film base before the photosensitive emulsion is added. The patent to Starck, U.S. 2,872,318, suggests that the above anchoring layer can be eliminated if a subbing layer is applied from a special mixture of solvents.

Photographic films prepared by these processes are expensive because of the multiplicity of steps involved in their manufacture.

The use of other film bases for photographic purposes has been suggested by Pat. 2,805,173 wherein polyethylene terephthalate is used and Pat. 3,112,199 wherein isotactic polypropylene is used. These patents show that anchoring layers and subbing layers can be eliminated if the polymer surface is treated with a solution of chlorosulfonic acid and then aminated with various amines before the photographic or light sensitive emulsion is applied. Photograhpic films prepared by the teachings of Pat. 2,805,173 are expensive due to the high cost of the polymer base. Photographic films prepared by the teachings of Pat. 3,112,199 lack the required stiffness for normal film processing and handling.

When attempts are made to sulfonate polypropylene and polyethylene terephthalate films to a high degree of sulfonation which is necessary for good adhesion, it is found that the film surface turns dark brown or black in the case of polypropylene and crumples away to a powder in the case of polyethylene terephthalate.

SUMMARY OF THE INVENTION

It now has been found that photographic films can be produced from biaxially oriented films of styrene polymers by sulfonating them with sulfur trioxide in the vapor phase to a high degree such that the surface of the styrene polymer film contains sulfonic acid groups in an amount from about 0.1 to about 10 micrograms of sulfur trioxide equivalents per square centimeter. The subsequent application of a photosensitive gelatine layer results in a photographic film that is economical to make, has good dimensional stability during photographic processing and has good adhesion between the base and the gelatine layer. It is also free of static which tends to minimize contamination from dust particles.

DETAILED DESCRIPTION

The polymer films to which this invention is directed are those known to the art and comprise oriented styrene polymer films. Non-oriented styrene polymer films lack the structural strength which is necessary in photographic film applications. These oriented styrene polymer films are sulfonated on one side to produce a high concentration of sulfonic acid groups directly attached to the polymer film. When these films are subsequently coated with a gelatin photosensitive layer directly on the sulfonated side of the film, the result is an astatic photographic film of good durability with good adhesion of the gelatin to the base film.

If desired, the polymer film can be sulfonated on both sides and a gelatin anti-halation layer applied to the back side of the film.

For the purposes of this invention, the term "high concentration of sulfonic acid groups" means a range from about 0.1 to about 10.0 micrograms of sulfur trioxide equivalents per square centimeter. A preferred range is from about 0.4 to about 2 micrograms of sulfur trioxide equivalents per square centimeter.

As is well known from the literature (e.g., "Encyclopedia of Polymer Science," vol. 2, pages 339–373) biaxial orientation increases the tensile strength of polymer films in general and for polystyrene film it raises the range of tensile strength to 9,000 to 12,000 pounds per square inch in both the machine direction and the transverse direction. Therefore, the film used in this invention are oriented styrene polymers having a tensile strength in the range of from 9,000 to 12,000 p.s.i. with or without impact strength modifiers of the type set forth below.

The film used in this invention must have a haze value in the range of 5% to 25% as tested according to ASTM D–672.

Types of oriented styrene polymer films which meet the above requirements are unmodified polystyrene, high impact polystyrene blends, and high impact styrene copolymer blends.

In general, the high impact polystyrene blends comprise a blend of a minor amount of synthetic rubber with polystyrene. The amount of synthetic rubber used is in the range of 1–6 percent by weight while the preferred range is 2–3 percent by weight based on the weight of the polystyrene. Examples of typical impact modifying synthetic rubbers are styrene-butadiene copolymers, acrylonitrile butadiene copolymers polyisoprene, polybutadiene, isobutylene-butadiene copolymers, isobutylene-isoprene copolymers and the like.

A minor amount of rubber impact modifiers ranging from about 1–6 percent by weight can be copolymerized with monoalkenyl aromatic monomers and a monomer such as methacrylate esters, itaconic esters, or acrylonitrile to produce films when oriented having good transparency provided that the synthetic rubber used has a refractive index in the range from $n_D^{25}$ 1.513 to 1.576. These films are known to the art.

The above films are vapor phase sulfonated with sulfur trioxide gas in a pure or dilute form to produce films having a high concentration of sulfonic acid groups directly attached to the styrene polymer as aforesaid. It is preferred to sulfonate the films by moving them through a blast or curtain of sulfur trioxide gas in the absence of water or water vapor as this technique provides a method with great speed, uniformity, and no complications such as removal of solvents, etc. Alternatively, films are passed through an atmosphere of gaseous sulfur trioxide. In this technique, slower speeds may be necessary to give adequate contact time between the film and the gas.

The sulfur trioxide gas can be used pure but since sulfur trioxide boils at 44.8° C. is difficult to keep it in the vapor state. The preferred method is to dilute vapors of sulfur trioxide with a dry inert gas such as air, carbon dioxide, nitrogen, and the like. A range of concentration of the $SO_3$ in the inert gas can be from 1–15 percent.

Another method of sulfonating the styrene polymer films is to treat them with a solution of $SO_3$ dissolved in an inert liquid solvent. This has the disadvantage that the solvent has to be removed and the films washed before the subsequent application of the gelatin coating. Typical useful inert liquid solvents are hydrocarbon solvents such as hexane, heptane, petroleum ether, kerosene, etc.

The range of concentration of $SO_3$ in the above solvents can be from 1–25 percent by weight $SO_3$ but it is preferred to use a lower range of from 1–5 percent by weight $SO_3$.

In the foregoing sulfonation processes the temperature can range from −20° C. to 60° C. with the preferred temperature range being 20° C. to 40° C.

The pressure at which the sulfonation is carried out can be atmospheric or superatmospheric. Because of the convenience, it is preferred to carry out the sulfonation at atmospheric pressure. However, the reaction can also be carried out at a pressure of 1–10 pounds per square inch gauge.

After the film is sulfonated to the required degree, it is coated with any one of a number of commercially available silver halide gelatin emulsions and dried. The film in the form of a roll can be unwound and dipped into the gelatin emulsion one or more times in order to build up a photosensitive layer of about 8 microns thick. The complete film is then allowed to dry for a period of about 2–3 weeks to allow the gelatin to harden.

The prepared photographic films are astatic and have good wet and dry adhesion between the photographic emulsion and the film base as indicated by a pressure sensitive tape test.

Example 1

A biaxially oriented polystyrene film 8½″ x 11″, having a thickness of 5 mils, is surface sulfonated in an atmosphere of a gaseous mixture of 2 percent by volume of sulfur trioxide in carbon dioxide for two minutes at a temperature of 25° C.

This gives the film surface layers of sulfonated polystyrene about 7 microns thick consisting of a plurality of sulfonic acid groups and having about 2 micrograms per square centimeter of sulfur trioxide equivalents.

This film is then coated with a layer about 8 microns thick with a photosensitive gelatin "Verichrome" (a commercially available silver halide gelatin emulsion) and dried for two weeks.

It is found that when cross hatched marks are inscribed into the emulsion of a dry film one sixteenth of an inch apart with a razor blade and pressure sensitive adhesive tape is pressed onto the inscribed lines, good adhesion is observed in that little of the emulsion is pulled up with the tape. Substantially the same results are obtained with a water soaked film.

Example 2

The procedure of Example 1 is repeated with an oriented polystyrene film containing 2½ percent by weight of 24 percent styrene and 76 percent butadiene copolymer rubber blended therein. Similar good adhesion is observed.

Example 3

The procedure of Example 1 is repeated with a transparent oriented film containing 5.7 percent by weight of a rubbery copolymer of 23.5 percent by weight of styrene and 76.5 percent by weight of butadiene having a refractive index $n_D^{25}$ of 1.535 copolymerized with 40 percent by weight of styrene and 60 percent by weight of methyl methacrylate. Similar good adhesion is observed.

What is claimed is:

1. In a method for making a photographic film wherein a gelatin photosensitive layer is applied to an oriented styrene polymer film base, the improvement which comprises sulfonating the styrene polymer film base, before application of the gelatin layer, with sulfur trioxide in the vapor phase until one of the surface layers thereof contains a high concentration of sulfonic acid groups attached to said styrene polymer.

2. The method of claim 1 in which the high concentration of sulfonic acid groups corresponds to about 0.1 to about 10.0 micrograms of sulfur trioxide equivalents per square centimeter.

3. The method of claim 1 in which the oriented styrene polymer is oriented polystyrene.

4. The method of claim 1 in which the oriented styrene polymer is a blend of a minor amount of a synthetic rubber and a styrene copolymer.

5. The method of claim 1 in which the oriented styrene polymer is a blend of a minor amount of a synthetic rubber and polystyrene.

6. The method of claim 1 in which the oriented styrene polymer is a copolymer of a minor amount of a synthetic rubber, a monoalkenyl aromatic monomer and a monomer selected from the group consisting of methacrylic esters, itaconic esters and acrylonitrile.

References Cited
UNITED STATES PATENTS

| 2,786,780 | 3/1957 | Walles et al. | 117—47 X |
| 2,805,173 | 9/1957 | Ambler | 117—62 |
| 3,112,199 | 11/1963 | Camerini et al. | 96—87 |

FOREIGN PATENTS

| 385,792 | 5/1963 | Japan | 96—87 |

RONALD H. SMITH, Primary Examiner

U.S. Cl. X.R.

117—34; 96—87 R